United States Patent

Seidel

[15] 3,701,950

[45] Oct. 31, 1972

[54] NARROW-BAND FILTER

[72] Inventor: Harold Seidel, Warren, N.J.

[73] Assignee: Bell Telephone Laboratories Incorporated, Murray Hil, N.J.

[22] Filed: April 14, 1971

[21] Appl. No.: 134,007

[52] U.S. Cl. ..........325/340

[51] Int. Cl. ..........H04b 1/26

[58] Field of Search........325/430, 431, 432, 434, 65, 325/473, 474, 475, 476, 477; 330/10, 4.5, 4.8, 53; 333/29, 10, 5, 15, 16; 328/167, 166, 165, 162

[56] References Cited

UNITED STATES PATENTS

| | | | |
|---|---|---|---|
| 2,540,532 | 2/1951 | Koch | 325/430 |
| 3,132,339 | 5/1964 | Boughnov | 325/473 |
| 3,019,296 | 1/1962 | Schelleny | 325/11 |
| 3,602,737 | 8/1971 | Rodecke | 328/167 |
| 3,271,689 | 9/1966 | Hodde | 328/167 |

*Primary Examiner*—Robert L. Griffin
*Assistant Examiner*—Barry L. Leibowitz
*Attorney*—R. J. Guenther and Arthur J. Torsiglieri

[57] ABSTRACT

An extremely narrow-band filter, having a passband of less than one hertz in the megahertz range, comprises two parallel, signal processing wavepaths, each of which includes, in cascade, a down-converter, a low-frequency narrow-band filter, and an up-converter. A local oscillator signal, derived from a common local signal source, is coupled to each of the converters in such phase that the output signal from each converter in one wavepath is in time quadrature with the output signal from the corresponding converter in the other wavepath. An input power divider couples the input of each down-converter to a common input circuit. A hybrid coupler connects the outputs from the two up-converters to a common output circuit.

In one embodiment, automatic frequency control is applied to the local oscillator along with means for controlling the bandwidth of the low-frequency filters. In another embodiment, the filter output signal is shifted in frequency and then used as the local oscillator.

7 Claims, 15 Drawing Figures

INVENTOR
H. SEIDEL
BY
Sylvan Sherman
ATTORNEY

MAGNITUDE DETECTOR

NOT CIRCUIT

AND GATE

VARIABLE PHASE SHIFTER

NARROW-BAND FILTER

This invention relates to extremely narrow-band filters.

BACKGROUND OF THE INVENTION

In U.S. Pat. No. 3,539,925, there is described an almost-coherent phase detector which effects the equivalent of phase detection in the absence of a coherent reference signal. As disclosed therein, the primary purpose was to obtain an output indication in the presence of an input signal of a particular frequency. In some applications, however, an output indication is insufficient. What is required is the actual recovery of the input signal. For example, in a pulse modulated transmission system, timing information for synchronization purposes must be obtained either from the PCM signal itself (see U.S. Pat. No. 3,480,869), or from a timing signal transmitted over a separate channel. Neither of these techniques is completely satisfactory, however. The former is unsatisfactory because it is subject to inaccuracies due to changes in the signal pattern and the general deterioration of the signal due to spurious noise and signal distortion along the transmission medium. The latter technique is undesirable as it wastes channel space. It would be preferable to transmit the timing information independently, but within the signal channel. In such an arrangement timing information is not obscured by changes in the signal, nor is the arrangement wasteful of channel space. However, the timing signal is obscured by the much larger information signal. In order to be practical, therefore, a filter of extremely narrow passband is required in order to recover the embedded timing information.

It is, therefore, the broad object of the present invention to isolate a relatively weak signal from among other relatively strong signals.

It is a more specific object of the present invention to provide a filter having an extremely narrow passband, where the term "extremely narrow," as used herein, refers to passbands of the order of one hertz and less at frequencies in the megahertz range.

SUMMARY OF THE INVENTION

An extremely narrow-band filter, in accordance with the present invention, comprises two parallel, signal processing wavepaths, each of which includes, in cascade, a down-converter, a low-frequency narrow-band filter and an up-converter. A local oscillator signal, derived from a common local signal source, is coupled to each of the converters in such phase that the output signal from each converter in one wavepath is in time quadrature with the output signal from the corresponding converter in the other wavepath.

An input power divider couples a common input circuit to the input of each of the down-converters. A hybrid coupler connects the outputs from the two up-converters to a common output circuit.

The low-frequency filters are tuned to about one hertz and have a bandwidth of a fraction of a hertz. In order to maintain the local oscillator frequency to within one hertz of the input signal, means are provided in a second embodiment of the invention, for sampling the difference frequency signal at the output of one of the low-frequency filters, and for generating an automatic frequency control signal which corrects the local oscillator frequency. In addition, means are provided for narrowing the passband of the low-frequency filter once the proper difference frequency has been acquired.

In a third embodiment of the invention, a portion of the output signal is amplified and shifted in frequency by an amount equal to the difference frequency. The frequency-shifted signal is then used as the local oscillator signal.

Also disclosed in an arrangement wherein a bandpass filter can be used to obtain a bandrejection characteristic.

It is a feature of the present invention that filters having bandwidths of the order of one hertz or less can be conveniently realized in the megahertz range. More generally, filter frequency-to-bandwidth ratios of $10^6$ and greater can be readily obtained over the entire radio frequency spectrum.

These and other features, advantages, and the nature of the present invention will appear more fully upon consideration of the various illustrative embodiments now to be described in detail in connection with the accompanying drawings.

DETAILED DESCRIPTION

Figure 1:
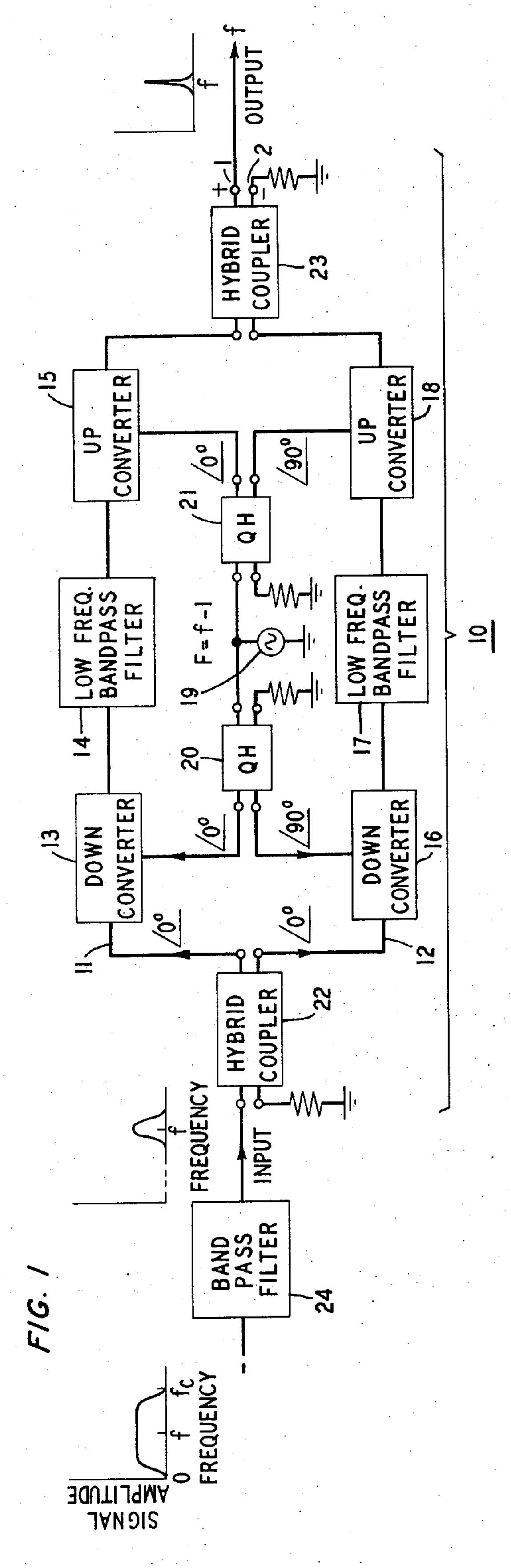
FIG. 1 shows a first embodiment of a filter in accordance with the present invention.

Referring to the drawings, FIG. 1 shows in block diagram an extremely narrow bandpass filter 10 in accordance with the present invention. The filter comprises two parallel, signal processing wavepaths 11 and 12, each one of which includes, in cascade, a down-converter, an extremely narrow-band, low-frequency filter, and an up-converter. More specifically, wavepath 11 includes a down-converter 13, a low-frequency filter 14, and an up-converter 15. Similarly, wavepath 12 includes a down-converter 16, low-frequency filter 17, and an up-converter 18.

A local oscillator signal, derived from a common local signal source 19, is coupled to each of the down-converters 13 and 16 through a first quadrature hybrid coupler 20, and to each of the up-converters 15 and 18 through a second quadrature hybrid coupler 21. The two wavepaths are coupled to a common input circuit by means of a first hybrid coupler 22, and to a common output circuit by means of a second hybrid coupler 23.

As indicated hereinabove, it is often necessary to extract a desired signal component from among many other signal components which are closely spaced in frequency and are of comparable or even greater amplitude than the desired signal. For purposes of illustration, the case of a pulse code modulated input signal is considered wherein the signal spectrum extends between zero and $f_c$ hertz, as illustrated in FIG. 1. As was also indicated hereinabove, signal regeneration and detection requires timing information which can either be extracted from the information signal, or provided by a separately transmitted timing signal. For purposes of illustration, the timing signal is separately transmitted at a frequency $f$ within the signal band. In order not to interfere with the encoded information signal, however, the timing signal power is much less than the information signal power and, thus, the problem of isolating a relatively weak signal that is embedded in a much stronger signal is squarely presented.

Referring again to FIG. 1, the signal is first passed through a bandpass filter 24, tuned to the timing signal frequency $f$. Designating the bandwidth of filter 24 as $\delta$, this initial filtering reduces the information signal power relative to the timing signal power by a factor $\delta/f_n$. Thus, the signal applied to filter 10 now comprises a relatively strong desired signal, at frequency $f$, and a noise component comprising that portion of the information signal that has been transmitted by filter 24. It is the object of filter 10 to further filter the signal and, thereby, to enhance the signal to noise ratio. Accordingly, the filtered signal, somewhat narrower in band, is applied to input coupler 22 wherein it is divided into two equal, in-phase signal components. Each component is coupled to a different down-converter along with a local oscillator signal derived from local oscillator 19. For reasons which will be explained hereinbelow, either the input signal components coupled to converters 13 and 16 are in phase, and the local oscillator signals are in time quadrature, as they are in the embodiment of FIG. 1, or, conversely, the input signals are in time quadrature, and the local oscillator signals are in phase. In this latter case, the input coupler would be a quadrature coupler and local oscillator signal 19 would be coupled directly to the down-converters.

The oscillator 19, as indicated in FIG. 1, is tuned to a frequency F which differs very slightly from the desired signal frequency $f$. For purposes of illustration, a one hertz (one cycle per second) target difference is assumed. Thus, $$F \approx f \pm 1 \,. \qquad (1)$$

More specifically, the oscillator hunts about the target value within a permissible range defined by the passband of the low-frequency filter. As will be explained hereinbelow, in one embodiment of the invention the range of hunting is progressively reduced by means of a frequency control process in which feedback is derived from the filtered signal itself.

The use of a local oscillator signal whose frequency is equal to $f$ is avoided since this would produce direct current outputs from the down-converters which might be ambiguous since direct currents can be produced by many spurious means. By contrast, the only mechanism likely to produce a one hertz signal is the interaction of the input signal and the local oscillator.

The amplitude $D_1$ of the difference signal derived from down-converter 13 is given by $$D_1 = A\cos(2\pi\Delta ft + \phi)\,, \qquad (2)$$

where $$\pi f = (f - F) \approx 1 \text{ hertz}$$

and $\phi$ is the phase difference between the two applied signals at time $t = 0$.

The amplitude $D_2$ of the difference signal derived from converter 16 is then $$D_2 = A\cos(2\pi\Delta ft + \phi - \pi/2) = A\sin(2\pi\Delta ft + \phi)\,. \qquad (3)$$

As is evident from equations (2) and (3), the quadrature relationship between the local oscillator signals coupled to the two down-converters, produces a quadrature relationship between the difference frequency signals. This will be of importance in obtaining the proper output signal, as will be explained hereinbelow. below.

While reference has been made to the difference frequency signal produced by the local oscillator signal and the desired input signal, the down-converter output signals also include other difference frequency components corresponding to all the input signal components within the passband of filter 24. In order to eliminate most of these spurious components, the converter output signals are passed through the extremely narrow-band, low-frequency filters 14 and 17 to which the converters are respectively coupled. These filters have passbands of the order of one hertz or less. As such, they essentially eliminate all but the desired difference frequency signal. The filtered low-frequency signals are then coupled to up-converters 15 and 18, along with local oscillator signals derived from local oscillator 19. The latter is coupled to the up-converters through a second quadrature coupler 21 to produce a quadrature phase relationship between the two local oscillator signals.

The output signals $E_1$ and $E_2$ from up-converters 15 and 18, being proportional to the product of the two input signals coupled thereto, are of the form $$E_1 = B\cos(2\pi\Delta ft + \phi)\cos 2\pi Ft\,, \qquad (4)$$

and $$E_2 = B\sin(2\pi\Delta ft + \phi)\sin 2\pi Ft\,. \qquad (5)$$

It will be noted that the amplitudes of the up-converter output signals, as given be equations (4) and (5), are modulated at the difference frequency rate. Since the latter is of the order of one cycle, this means that there will be relatively long intervals over which the signal amplitudes will be too small to be useful. It will also be noted, however, that because of the quadrature relationship between $E_1$ and $E_2$, when one of the two signals is going through its minimum amplitude, the other is going though its maximum. Thus, because of the phase diversity effect produced by the two parallel wavepaths, the information is always present and is made available by coupling signals $E_1$ and $E_2$ to the output hybrid coupler 23. The latter, being of the magic-T, in-phase variety of coupler, produces sum and difference signals, respectively, at the coupler output ports 1 and 2, where the sum signal $V_1$ in port 1 is given by $$V_1 = B\cos(2\pi\Delta ft+\phi)\cos 2\pi Ft + B\sin(2\pi\Delta ft+\phi)\sin 2\pi Ft,$$

or $$V_1 = C\cos(2\pi ft+\phi),$$

and the difference signal $V_2$ in port 2 is given by $$V_2 = B\cos(2\pi\Delta ft+\phi)\cos 2\pi Ft - B\sin(2\pi\Delta ft+\phi)\sin 2\pi Ft,$$

or $$V_2 = C\cos[2\pi(2F-f)t-\phi]. \quad (7)$$

It will be noted that the sum signal $V_1$ is the upper sideband at frequency $f$, equal to the frequency of the desired signal, whereas the difference signal $V_2$ is the lower sideband at frequency $2F-f$. Since the former signal is the signal sought, port 2 is terminated and the output taken from coupler port 1. It will also be noted that the output signal $V_1$ has a constant amplitude C and, hence, the timing information embedded in the input signal is continuously available.

In the embodiment of FIG. 1, the overall filter bandwidth is defined by the bandwidth of the internal low-frequency filters 14 and 17. Advantageously, this bandwidth is made very narrow so as to obtain the cleanest output signal. However, as the bandwidth of these filters is reduced, the frequency stability of the local oscillator must be correspondingly increased since any tendency for it to drift will place the difference frequency outside the very narrow passband of filters 14 and 17, and the desired signal will be lost. To appreciate the problem, the local oscillator frequency F would typically be in the tens or hundreds of megahertz, whereas the difference frequency is of the order of one hertz. A preferable arrangement would be one including automatic frequency control wherein the difference frequency signal is monitored, and an error signal generated to control the frequency of the local oscillator. Such an arrangement is illustrated in block diagram in FIG. 2.

Figure 2:
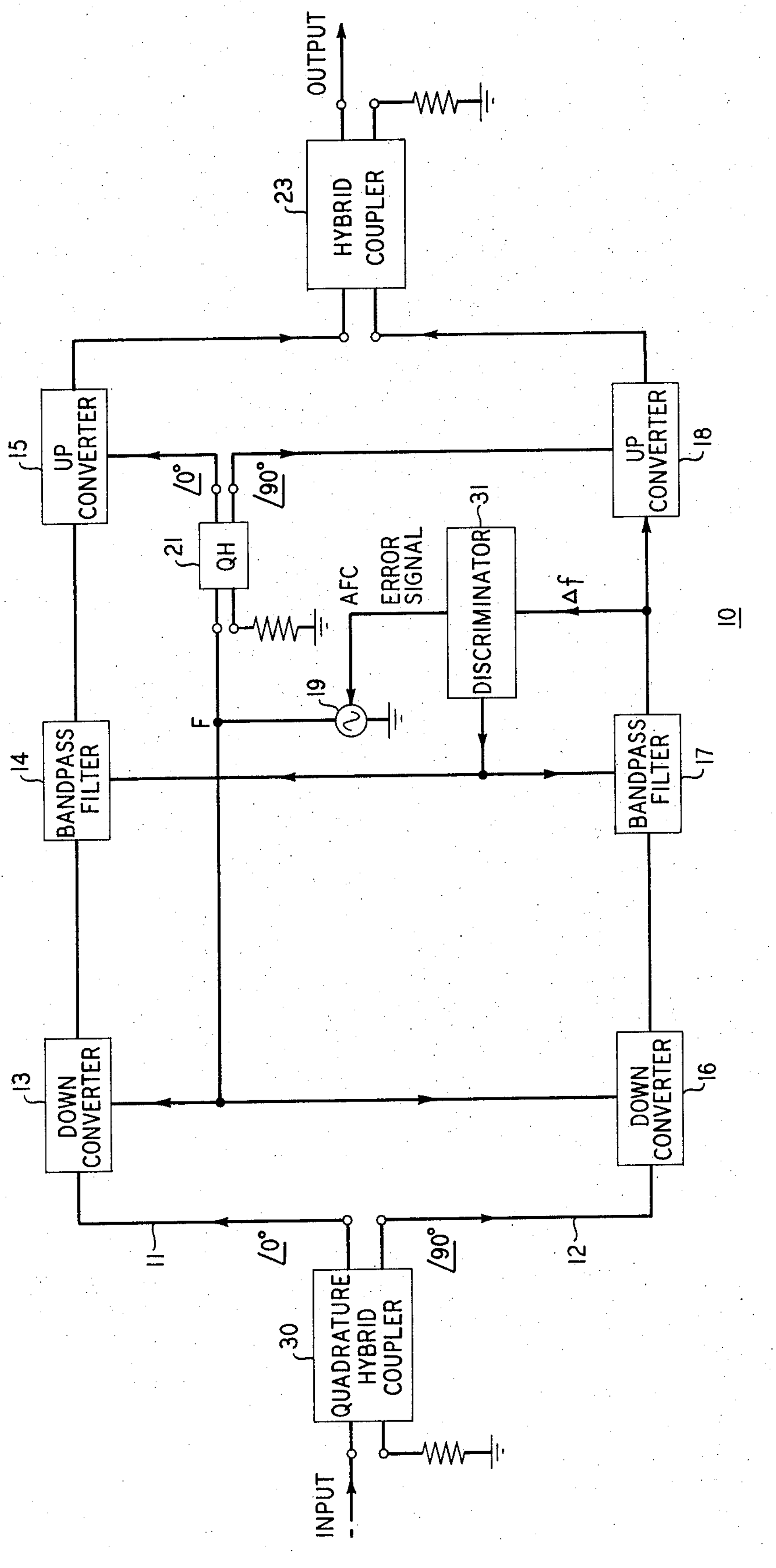
FIG. 2 shows a second embodiment of a filter, in accordance with the present invention, including automatic frequency control and variable bandwidth, low-frequency filters.

Using the same identification numerals to identify corresponding components from FIG. 1, the embodiment of FIG. 2 comprises the two parallel wavepaths 11 and 12, each of which includes, in cascade, a down-converter (13, 16), a narrow-band, low-frequency filter (14, 17) and an up-converter (15, 18). A local oscillator signal, derived from local oscillator 19, is coupled to each of the converters. In the embodiment of FIG. 2, however, the input power divider 30, is a quadrature hybrid coupler which introduces a quadrature phase relation between the input signal components coupled to the respective down-converters. Hence, the local oscillator signals are directly coupled to the down-converters in phase in the embodiment of FIG. 2. The local oscillator is coupled to the up-converters through quadrature coupler 21, as in the embodiment of FIG. 1. The two wavepaths are coupled to the output circuit by means of hybrid coupler 23.

Automatic frequency control of the local oscillator is effected by sampling the difference frequency signal at the output of either one of the low-frequency filters 14 or 17. For purposes of illustration, the difference frequency signal from filter 17 is coupled to a discriminator 31 adapted to produce a specified reference signal when the difference frequency $\Delta f$ is correct. Using the same frequencies as were used in connection with the description of FIG. 1, the discriminator output is adjusted to the specified reference signal when $\Delta f$ is equal to one hertz. Whenever the local oscillator frequency drifts so as to increase $\Delta f$, an error signal of one polarity relative to the reference signal is produced by discriminator 31 which, when coupled to oscillator 19, tends to change the frequency of the local oscillator so as to reduce $\Delta f$. Conversely, whenever the measured difference frequency is less than the prescribed one hertz, an error signal of the opposite polarity relative to the reference signal is produced which, when coupled to oscillator 19, tends to change the oscillator frequency in a sense to increase the difference frequency. Tuning of oscillator 19 is conveniently done, for example, by means of a varactor diode coupled across the oscillator tuned circuit. As is known, the equivalent capacitance of a varactor diode varies as a function of the bias applied thereto and, hence, provides a convenient means for changing the frequency of an oscillator.

While an AFC circuit of the type described will help maintain the local oscillator at the prescribed frequency, its operation presupposes, in the first instance, that a difference frequency signal close to the correct difference frequency is available. However, it will be recognized that if, for some reason, the local oscillator frequency is sufficiently different than what it should be, the difference frequency may well be outside the passband of filters 14 and 17. In such a situation, there will be no difference frequency signal component coupled to the discriminator in the first instance and, hence, no way for the discriminator to generate a proper error signal. Clearly, the AFC circuit will be unable to correct the local oscillator in such a situation.

One way to avoid this possibility is to increase the passband of filters 14 and 17. This solution to the problem has the disadvantage that it also widens the overall passband of filter 10. Nevertheless, widening the passband of filters 14 and 17 at least until such time as the AFC circuit is made operative is essential. To avoid the abovenoted disadvantage, however, filters 14 and 17 are made adjustable so that after the proper difference frequency signal is acquired by the discriminator, the passbands of these filters are automatically narrowed to the desired width in response to a second signal from discriminator 31. Accordingly, in the embodiment of FIG. 2, a second signal is extracted from discriminator 31 and is coupled to each of the internal filters 14 and 17. This signal activates the filters so as to reduce their passbands once the proper difference signal has been acquired.

Thus, in summary, in the embodiment of FIG. 2, an automatic frequency control circuit is provided which monitors the difference frequency $\Delta f$ and develops an error signal which retunes the local oscillator whenever $\Delta f$ deviates from the correct value. To insure that the difference frequency signal does not fall outside the passband of filters 14 and 17, the latter are made adjustable. Initially the passbands are relatively broad, permitting the discriminator to acquire a difference frequency signal. Once acquired, the filter passbands are narrowed to their operating widths in response to a second signal from the discriminator.

While there are standard forms of the various circuits identified in the block diagrams of FIGS. 1 and 2, the very low difference frequency (of ≈ 1 hertz) places some practical limitations on the forms that the difference frequency circuits can conveniently take. For example, it probably would not be convenient to use L–C circuits to form the extremely narrow-band filters 14 and 17. Instead, R–C circuits of the parallel-T variety, such as are described in an article entitled "Analysis of a Resistance – Capacitance Parallel-T Network and Applications" by A. E. Hastings, (published in the March 1946 issue of the *Proceedings of the I.R.E.*, pp. 126P–129P), are advantageously used. Networks of this type consist, generally, of two, parallel-connected T networks. One symmetric form of such a network, illustrated in FIG. 3, comprises a first T network having two series resistors R, and a shunt capacitor 2C, connected in parallel with a second T network having two series capacitors C, and a shunt resistor R/2. Such a network has a transmission characteristic of the type shown in FIG. 4A, which includes a null at a frequency $f_n$ given by $$f_n = 1/2\pi RC. \qquad (8)$$

Figure 4B:
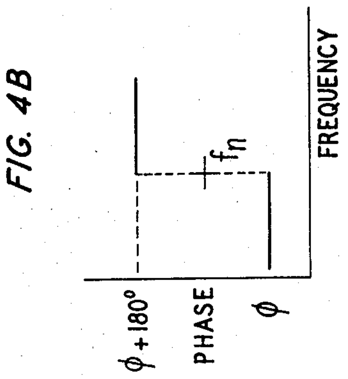
FIGS. 3 4A and 4B show a parallel-T filter and its transmission characteristics.

The phase characteristic for this network, as shown in FIG. 4B, includes a 180° phase transistion as the frequency goes from below to above $f_n$.

Both of these characteristics, i.e., the null and the 180 degree phase reversal, typical of this type of network, can be conveniently used to form the active filters and the AFC circuit for use in connection with the present invention.

Filter

Figure 3:
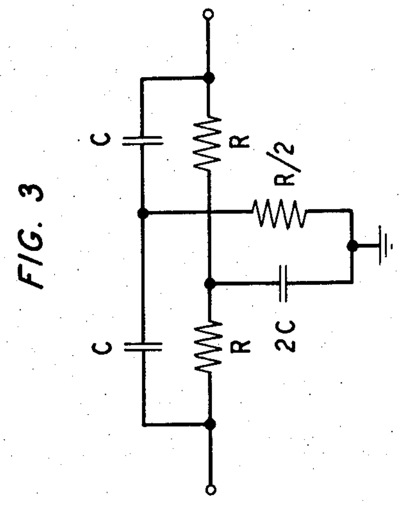
Figures 5, 6, 6A:
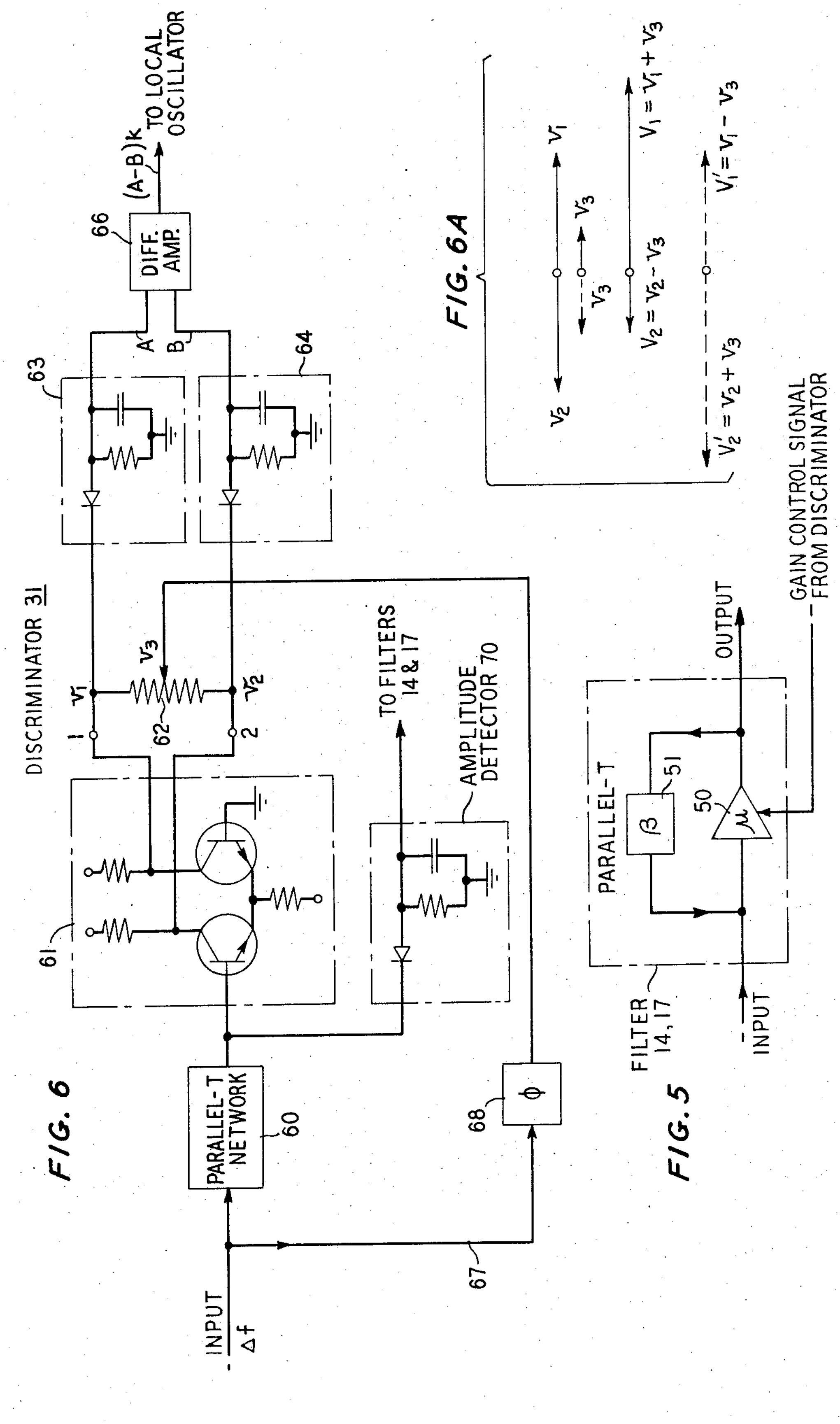
FIG. 5 shows a variable bandwidth, low-frequency filter.
FIGS. 6 and 6A show a discriminator for generating an AFC signal and a filter bandwidth control signal.

A filter, for use in connection with the present invention, is obtained, as explained in the above-identified article, by using a parallel-T network as the feedback circuit of a feedback amplifier in the manner illustrated in FIG. 5. Thus, each of the filters 14 and 17 comprises an amplifier 50, having a gain $\mu$, and a feedback circuit 51, comprising a parallel-T network. Amplifier 50 has a substantially flat gain-frequency characteristic over the frequency range of interest. By feeding back a portion of the output signal through a parallel-T network, the amplifier is highly degenerative at all frequencies except in the region of the null frequency $f_n$. At the null frequency, the degeneration is zero, and the amplifier operates at full gain. Using a symmetric parallel-T network, such as is illustrated in FIG. 3, the bandwidth, $\alpha$, of the filter shown in FIG. 5 is $$\alpha = 2f_n/\mu. \qquad (9)$$

As will be noted, the bandwidth of this type of filter is a function of the amplifier gain $\mu$ and, thus, provides a convenient means for varying the filter bandwidth. In particular, a signal, derived from discriminator 31 in a manner to be described hereinbelow, is applied to amplifier 50 as a gain control. For example, by making $f_n = \Delta f$, and by varying the amplifier gain from one to 1000, the filter bandwidth can be readily varied from between 2 hertz and one-thousandth of a hertz.

Discriminator Circuit

FIG. 6 shows an illustrative embodiment of a discriminator for use in the local oscillator automatic frequency control circuit described in connection with FIG. 2. The discriminator comprises a parallel-T network 60, whose output is coupled to a first differential amplifier 61. The outputs from amplifier 61, along with a delayed component of the difference signal, are coupled to separate amplitude detectors 63 and 64. The detected signals A and B are then coupled to a second differential amplifier to produce an amplified difference signal $k$(A–B) which is used to control the frequency of oscillator 19.

In operation, a difference frequency signal, at frequency $\Delta f$, is coupled to the parallel-T network 60. When the difference frequency is equal to the network null frequency, $f_n$, there is no signal coupled from network 60 to amplifier 61. There is, however, a component of the difference frequency signal fed forward along a parallel wavepath 67 to a center-tap on a resistor 62 which is connected between the two output ports 1 and 2 of amplifier 61. This component of the difference frequency signal produces equal voltages at the inputs of detectors 63 and 64 which, in turn, produce two equal output signals A and B. Being equal, their difference (A–B) is zero, and no correction voltage is coupled to oscillator 19.

When, however, the difference frequency Δf is not equal to the null frequency $f_n$, a signal is coupled to the first differential amplifier, producing an output voltage $v_1$ at amplifier port 1 and a voltage $v_2$ at amplifier port 2, where $v_1$ and $v_2$ are 180° out of phase, as shown by vectors $v_1$ and $v_2$ in FIG. 6A.

Simultaneously, a delayed component $v_3$ of difference signal is coupled to the center-tap on resistor 62. The phase of this component relative to $v_1$ and $v_2$ is controlled by a phase delay network 68 which is adjusted such that $v_3$ is in phase with either $v_1$ or $v_2$. More specifically, the phase of $v_3$ is selected such that the polarity of the AFC voltage developed by the discriminator is such as to make the proper frequency correction. For example, when $v_3$ is in phase with $v_1$, as shown by the solid vector in FIG. 6A, the two signals $v_1$ and $v_3$ add algebraically to produce an output signal $V_1$, whereas $v_2$ and $v_3$ subtract algebraically to produce an output signal $V_2$. The effect is to unbalance the two signals coupled to detectors 62 and 64 and, hence, the detector output signals A and B coupled to amplifier 66 are also unequal. In particular, with A greater than B, an AFC voltage of positive, relative polarity is produced.

It will be recalled from FIG. 4B that there is an abrupt 180° relative phase shift produced by the parallel-T network as the signal frequency goes from one side of the null frequency to the other side of the null frequency. Thus, the phase of $v_3$ relative to $v_1$ and $v_2$ changes by 180° whenever the difference frequency goes from one side of the null frequency to the other. This is shown by the broken vector $v_3$ in FIG. 6A. Thus, in this second case when $v_3$ is added to $v_2$ and $v_1$, the resulting output signal $V'_2$ is now larger than $V'_1$. As a consequence, the relative amplitudes of the detected signals A and B are also reversed such that an output difference signal of negative, relative polarity is produced.

Figure 4A:
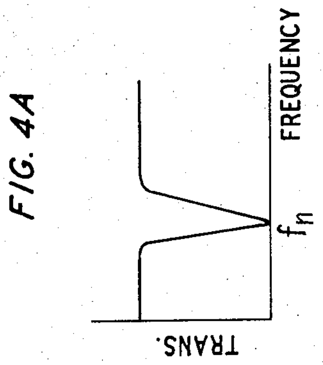

In addition to responding to the sense in which the difference frequency signal has deviated from the correct difference frequency, as defined by the null frequency of network 60, the amplitude of the AFC signal also increases very rapidly in proportion to this deviation due to the narrow transmission characteristic of the parallel-T network, as illustrated in FIG. 4A.

In addition to supplying an AFC signal to oscillator 19, the discriminator also supplies a signal to vary the bandwidth of the low-frequency filters 14 and 17. In the illustrative embodiments of the low-frequency filters illustrated in FIG. 5, the bandwidth is controlled by varying the gain of amplifier 50. This is conveniently accomplished by varying the bias applied to the amplifier. Accordingly, a portion of the output signal from the parallel-T network 60 is amplitude detected by means of a detector 70. When the difference frequency $\Delta f$ is different than the null frequency of the parallel-T network, a signal is detected whose polarity is such as to reduce the amplifier gain and, thereby, to broaden the filter passband. As the difference frequency approaches the proper frequency, (i.e., the parallel-T null frequency), the amplitude of the signal at the output of the parallel-T network decreases, thereby increasing the amplifier gain. At the null frequency, the signal reduces to zero, permitting amplifier 50 to obtain its maximum gain, and each filter to reach its minimum bandwidth.

In each of the illustrative embodiments described in connection with FIGS. 1 and 2, a highly stable high-frequency local oscillator 19 is required. Specifically, the local oscillator must maintain its frequency to within a few cycles of the signal frequency to be isolated. Since a filter of the type described would be advantageously included at each regenerative repeater of a typical PCM transmission system, it is apparent that a considerable savings could be effected if means were devised for eliminating the need for a separate local oscillator at each repeater. Such an arrangement is disclosed in connection with a third embodiment of the invention now to be described in connection with FIG. 7.

In view of the fact that the timing signal is continuously transmitted, it follows that an output signal at frequency $f$ will be continuously available at the filter output. It is, accordingly, proposed to translate this frequency an amount $\pm\ \Delta f$, such that the translated frequency $f \pm \Delta f$ is equal to the local oscillator frequency F, and then to use this frequency-translated output signal as the local oscillator. In such an arrangement a separate, or "priming" local oscillator is only required to get the filter operating, after which the filter is self-sustaining, and the priming local oscillator can be removed. The advantage of such an arrangement is that only a relatively few high-frequency oscillators are initially needed, and solely for the purpose of making the system operative. Thereafter, none are required for the continuing operation of the system.

In order to replace the local oscillator, a number of conditions must be established. These are:

1. that there is a filter output signal;
2. that this output signal is at the correct frequency; and
3. that the frequency-translated signal and the priming local oscillator have the same phase.

When, and only when these three conditions are satisfied, is the priming local oscillator replaced by the frequency-translated filter output signal. Once this switch has been made, the priming local oscillator and the associated logic circuits for verifying the above-mentioned conditions, can be physically removed. Accordingly, in the embodiment of FIG. 7, now to be described, the priming local oscillator and logic circuits 70 are shown within a dashed box, to represent that portion of the circuit that is removable. The filter 10, as in each of the previous embodiments, comprises two parallel wavepaths 11 and 12, each of which includes, in cascade, a down-converter (13, 16), a low-frequency filter (14, 17), and an up-converter (15, 18). An input coupler 22 couples the two wavepaths to a common input circuit, and a second coupler 23 couples the two wavepaths to a common output circuit.

Figure 7:
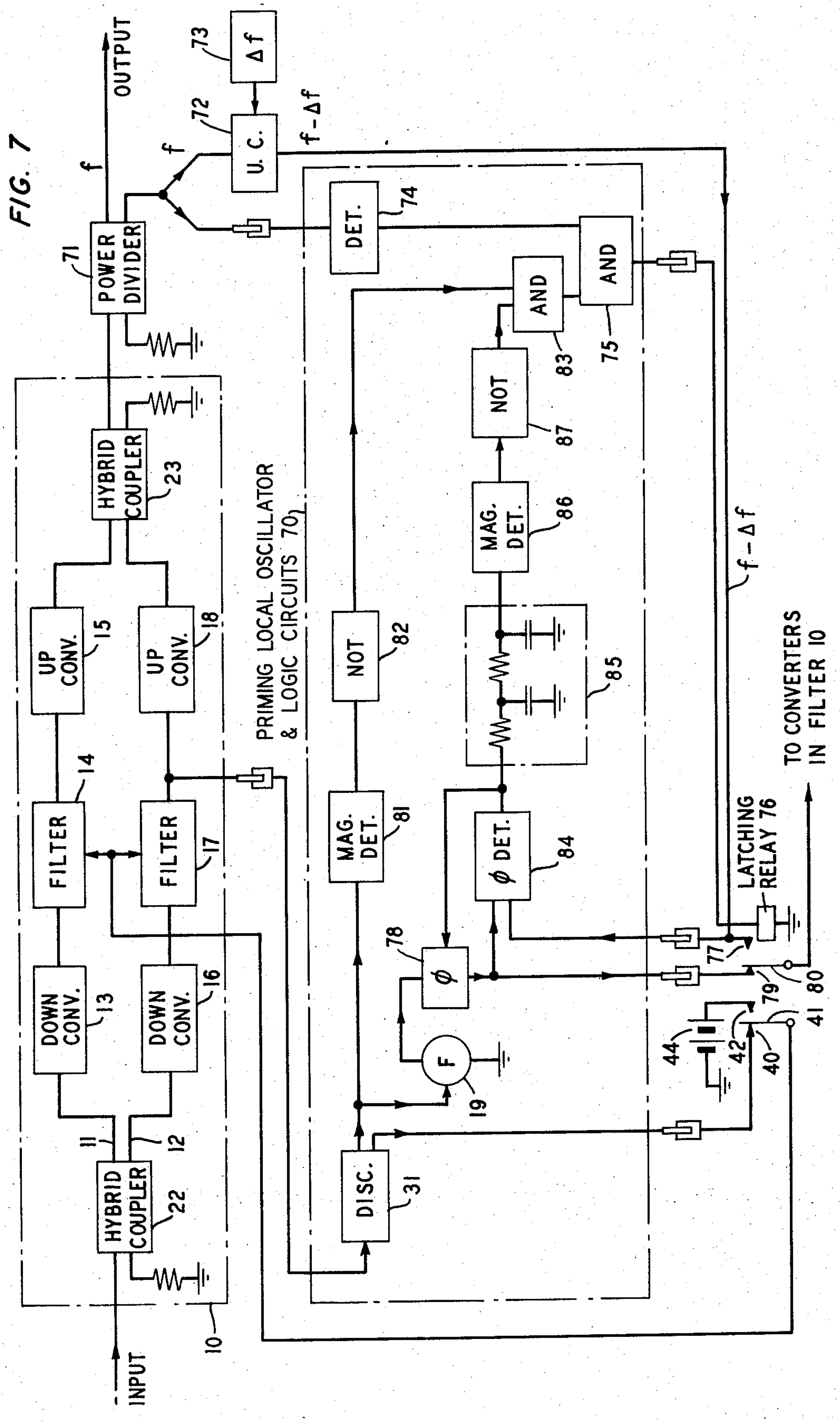
FIG. 7 shows a third embodiment of a filter, in accordance with the present invention, including means for using the filter output signal to generate a local oscillator signal.

The filter is made operative by coupling local oscillator 19 to the filter converters in the manner described hereinabove. In the embodiment of FIG. 7, local oscillator 19, which is included as part of the oscillator and logic circuits 70, is coupled through a variable phase shifter 78 to contact 79 of a latching relay 76. Initially, relay armature 80 is in contact with contact 79, thereby coupling oscillator 19 to the various converters in filter 10.

In order to satisfy the first condition outlined above, a portion of the filter output signal is extracted by means of a power divider 71 and coupled to an amplitude detector 74. The latter detects the presence of an output signal, and couples an enabling signal to an AND gate 75. Conversely, in the absence of a filter output signal, AND gate 75 remains disabled.

Another portion of the output signal is coupled to an up-converter 72 along with a signal from a low-frequency oscillator 73. The appropriate sideband signal to form the local oscillator frequency is extracted from up-converter 73, and coupled to contact 77 of latching relay 76. Since it was assumed hereinabove that the local oscillator frequency was less than the signal frequency by an amount $\Delta f$, the lower sideband $f - \Delta f$ is used. Obviously, the upper sideband $f + \Delta f$ can alternatively be used by making $F = f + \Delta f$.

To insure that the output signal has the correct frequency, discriminator 31, which is also part of the oscillator and logic circuits 70, monitors the output signal from one of the low-frequency filters 17. In turn discriminator 31 generates a filter control signal which is coupled to the two low-frequency filters 14 and 17 through a contact 40 and an armature 41 on latching relay 76. As explained hereinabove, if the difference frequency $\Delta f$ is not correct, discriminator 31 develops a first signal which broadens the passband of the low-frequency filters 14 and 17. In addition, the discriminator develops an AFC signal which is coupled directly to oscillator 19. As explained hereinabove, the AFC signal changes the local oscillator frequency in such a manner so as to produce the correct difference frequency. When this condition is established, the AFC signal assumes some specified reference level which, thereafter, maintains oscillator 19 at the correct frequency.

The discriminator output is also monitored in the embodiment of FIG. 7 to verify the second condition set forth hereinabove, i.e., that the filter output frequency is correct. This is done by detecting the AFC signal by means of a magnitude detector 81. When the AFC signal voltage is greater or less than the reference voltage, detector 81 produces an output signal which is coupled to a NOT circuit 82. The latter, in turn, generates a disabling signal which is coupled to AND gate 83. When the filter is properly tuned, on the other hand, the AFC signal is equal to the reference level. This is detected, causing NOT circuit 82 to generate an enabling signal at AND gate 83.

The third condition to be satisfied relates to the relative phase between the local oscillator signal and the up-converter filter output signal, $f - \Delta f$, derived from up-converter 72. Thus far, it has been established that $F = f - \Delta f$. However, before the latter can be substituted for the former, the two signals must also be phase-locked. This latter condition is established by comparing the phases of these two signals in a phase detector 84 whose output varies according to the sine of their phase difference. Rather than merely wait for the two signals to drift into phase coincidence, the phase detector output is coupled to a variable phase detector 78 which introduces a controlled phase shift to the local oscillator signal. In addition, the phase detector output is coupled through a long time constant, R–C low-pass filter 85 to a magnitude detector 86. When the two signals are out of phase, the magnitude of the output signal from phase detector 84, as measured by detector 86, causes a NOT circuit 87 to generate a disabling signal at AND gate 85. Once phase shift 78 has corrected the phase of the oscillator signal, the output from phase detector 84 reduces to z zero. If this phase-locked condition persists over a sufficiently long period, as defined by the time constant of low-pass filter 85, the input voltage to detector 86 also reduces to zero, causing the NOT circuit to generate an enabling signal at AND gate 83.

With enabling signals from NOT circuits 82 and 87 applied simultaneously to AND gate 83, the latter is activated and couples an enabling signal to AND gate 75. This, in turn, activates latching relay 76, causing the armature 80 to switch from contact 79 to 77, thereby disconnecting oscillator 19 and connecting the output signal from up-converter 72 to the filter converters. Simultaneously, armature 41 switches from contact 40 to contact 42, disconnecting discriminator 31 and connecting filters 14 and 17 to a constant source of potential 44. The latter, equal in magnitude to the reference level established by discriminator 31, locks the filters in their narrow-band condition. Once this switch is made, the priming local oscillator and logic circuits 70 can be removed, and the filter will continue to operate in this frequency-locked condition so long as a signal at frequency $f$ is received. Advantageously, the pairs of contacts on latching relay 76 are of the make-before-break variety.

While the various logic circuits referred to hereinabove are standard circuits (See, for example, "-Switching Circuits for Engineers" by M. P. Marcus, published by Prentice-Hall, Inc.) a number of illustrative circuits will now be briefly described in connection with FIGS. 8 to 10.

Magnitude Detector

Figure 8:
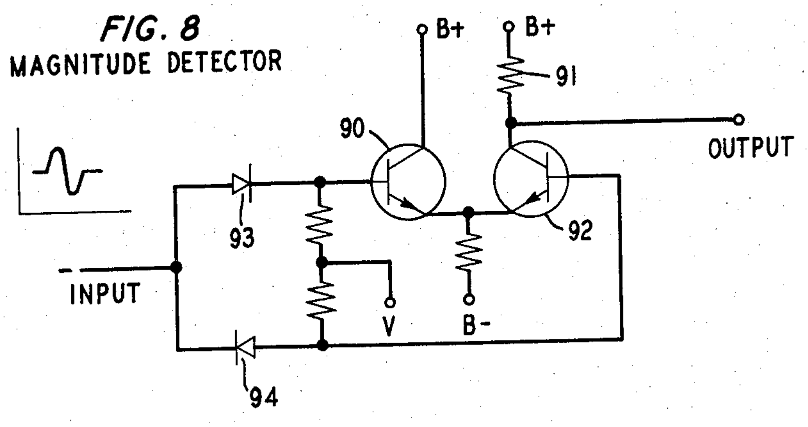
FIGS. 8–12 show various illustrative embodiments of circuits for use in connection with the embodiment of FIG. 7.

The first of these circuits, illustrated in FIG. 8, is a magnitude detector whose output is indicative of only the amplitude of the input signal and not its relative polarity. This circuit includes two transistors 90 and 92, connected to form a differential amplifier. One of the transistors 92 includes a load resistor 91 in its collector circuit, across which the output signal is developed. The input signal is coupled, simultaneously, to the base electrode of transistor 90 through a first diode 93, and to the base electrode of transistor 92 through a second, oppositely poled diode 94. The diodes are back-biased by means of a reference voltage V such that neither diode conducts when the input signal is equal to V. This corresponds, for example, to the situation where the input difference frequency $\Delta f$ to discriminator 31 is correct. If, however, the difference frequency is off in one direction, a signal greater than the reference level is produced by the discriminator. This causes diode 93 to conduct, thereby increasing the base-to-emitter bias and, causing transistor 90 to draw more current. This produces a corresponding reduction in the current through transistor 92, thereby raising the output voltage. Conversely, if the difference frequency is off in the opposite direction, the input signal to the detector is less than the reference level, causing diode 94 to conduct and, thereby, reducing the base-to-emitter bias in transistor 92. This also causes a reduction in the current drawn by transistor 92 and a corresponding increase in the output voltage. Thus, the magnitude detectors 81 and 86 respond only to the magnitude of any change in the input signal relative to some reference voltage, and not to the sense of the change.

NOT Circuit

Figure 9:
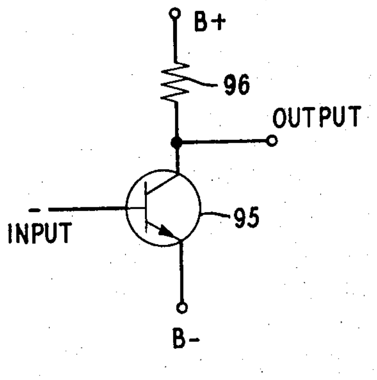
Figure 10:
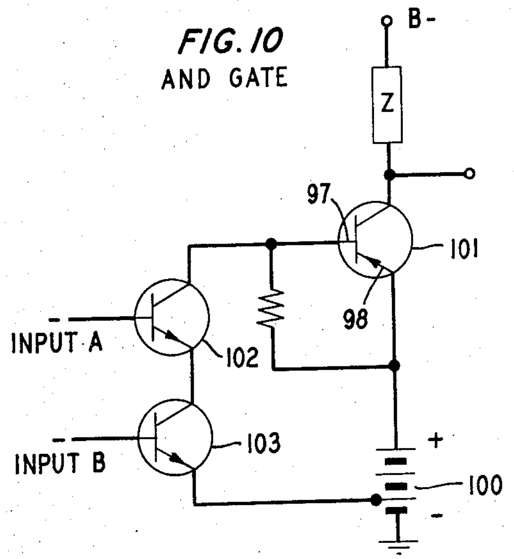

The NOT circuit, illustrated in FIG. 9, comprises a switching transistor which switches from an "off" state to a "saturated" stage in response to slight changes in input signal. Thus, for example, NOT circuits 82 and 87 would be saturated for all outputs from magnitude detectors 81 and 86 which do not correspond to the preferred signal state. At the preferred state, the outputs from magnitude detectors are minimum, causing the NOT circuits to switch from their saturated state to their off state, producing a corresponding increase in output voltage across load resistor 96. The resulting increases in voltage produced by the NOT circuits are coupled to the respective AND gates 83 and 75, of which the embodiment disclosed in FIG. 10 is typical.

AND gate

Basically, an AND gate responds when, and only when, two enabling signals are simultaneously coupled thereto. The AND gate illustrated in FIG. 10 comprises a p-n-p transistor 101 whose base electrode 97 and emitter electrode 98 are connected to a common positive direct current source of potential 100. Base electrode 97 is connected to a lower positive potential tap on source 100 through two series connected n-p-n transistors 102 and 103. In particular, base 97 is connected to the collector electrode of transistor 102. The emitter electrode of the latter is, in turn, connected to the collector electrode of transistor 103, while the emitter electrode of transistor 103 is connected to the tap of source 100. The base electrode of transistor 102 and the base electrode of transistor 103 are the AND gate input ports.

In the disabled state, the voltages applied to either or both of the input ports of the AND gate are such that one or both of transistors 102 or 103 are nonconducting. In this state, the emitter-base bias on transistor 101 is zero, and the transistor is in a low conductivity state. If, however, enabling signals are simultaneously applied to the AND gate, both transistors 102 and 103 are switched to a conducting state. This increases the emitter-base bias on transistor 101 and causes the latter to conduct. In the case of AND gate 83, this results in a second enabling signal being transmitted to AND gate 75 which, in turn, activates latching relay 76.

Variable Phase Shifter

Figure 11:
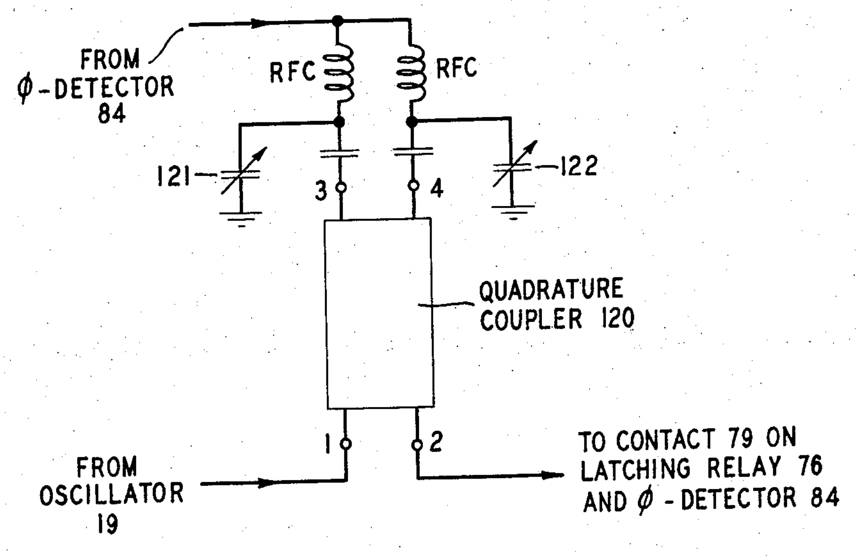

FIG. 11 shows a variable phase shifter comprising a 3 db quadrature coupler 120 and two varactor diodes 121 and 122. The latter are connected, respectively, to conjugate ports 3 and 4 of coupler 120 through blocking capacitors. A phase control signal from phase detector 84 is coupled to the two varactors through r.f. chokes.

The local oscillator 19 is coupled to port 1 of the coupler. The other port 2 is coupled to the phase detector and to contact 79 of latching relay 76.

In operation, the signal from oscillator 19 is divided into two equal components by coupler 120. The two components, appearing at ports 3 and 4, are reflected by the varactors and recombine in output port 2. The total phase delay experienced by the signal by virtue of the above-described transit from port 1 to port 2 depends upon the magnitude of the equivalent capacitance of the varactors which is controlled by the bias applied thereto by phase detector 84.

Up-Converter

The last circuit to be considered is up-converter 72 which translates the filter output frequency $f$ by an amount $\Delta f$. It will be recalled that filter 10 has a center frequency $f$ in the megahertz range, whereas the difference frequency $\Delta f$ is of the order of one hertz. Accordingly, the output of a conventional up-converter would include a carrier component at frequency $f$ and a pair of sidebands $f \pm \Delta f$, which are separated from the carrier frequency by only $\pm$ 1 hertz. It is apparent that the desired sideband $f - \Delta f$ could not be isolated from the other signal components by conventional filter means. Accordingly, the phase diversity technique, used in connection with filter 10, is employed in the manner illustrated in FIG. 12.

As illustrated, two up-converters 130 and 131 are employed. The difference frequency signal $\Delta f$ is coupled through an emitter-follower stage 138 to two 45° R–C phase shifters 132 and 133 which, between them, produce two difference frequency signal components that are 90° out of phase. One component, $\cos 2\pi\Delta ft$, is coupled through a buffer amplifier 135 to up-converter 131. Simultaneously, the filter output signal at frequency $f$ is coupled to the up-converters through a quadrature coupler 136. The latter produces one component, $\cos 2\pi ft$, which is coupled to up-converter 130, and a second component, $\sin 2\pi ft$, which is coupled to up-converter 131. The up-converter output signals, $V_1$ and $V_2$, being the product of the input signals, are then $$V_1 = K\cos(2\pi\Delta ft)\cos(2\pi ft) \quad (10)$$

and $$V_2 = K\sin(2\pi\Delta ft)\sin(2\pi ft). \quad (11)$$

To obtain the lower sideband $f - \Delta f$, the up-converter signals, given by equations (10) and (11), are coupled to hybrid coupler 137, which forms the sum signal $$D_1 = C\cos[2\pi(f+\Delta f)t], \quad (12)$$

at one of the coupler output ports 2, and the difference signal $$D_2 = C\cos[2\pi(f-\Delta f)t], \quad (13)$$

at the other coupler output port 1. Since the latter signal is the desired one, port 2 is terminated and the signal at port 1 is coupled to latching relay 76.

Bandrejection Filter

Figures 12, 13:
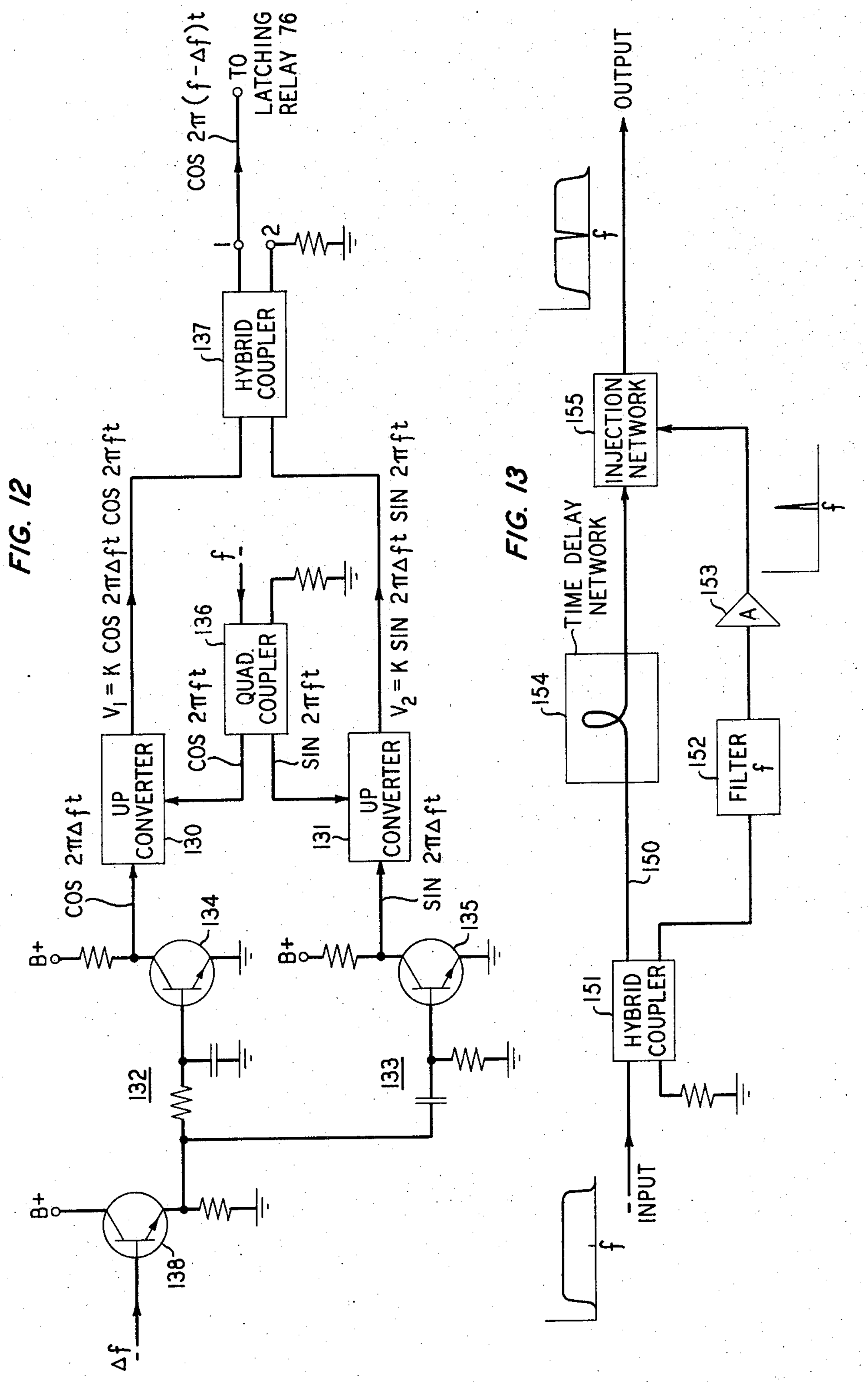
FIG. 13 shows a filter, in accordance with the present invention, arranged to produce a bandrejection characteristic.

The filters described hereinabove, have been characterized as bandpass filters. There are, however, many applications wherein a very narrow band of signals must be eliminated from within the band of interest. FIG. 13, now to be described, illustrates one arrangement where a bandpass filter of the type described can be used to produce a narrow banrejection filter. In this arrangement, a portion of the input signal, which includes components about the frequency $f$ to be eliminated, is coupled out of the main signal path 150 by means of a power divider such as, for example, a hybrid coupler 151. The coupled portion is passed through a filter 152, of the type described hereinabove, to produce a narrow-band output signal at frequency $f$. The latter is amplified by means of an amplifier 153 and injected back into the main signal path in such phase and time as to cancel the corresponding signal components in the main signal. The resulting output signal, as illustrated, includes a narrow notch at frequency $f$ whose bandwidth is defined by filter 152.

A time delay network 154 may be included in the main signal path to equalize the time delays through the two parallel wavepaths. Injection network 155 can be a hybrid coupler, or one of the injection networks described in either U.S. Pat. No. 3,471,798 or in the copending application by H. R. Beurrier, Ser. No. 113,213 filed Feb. 8, 1971.

SUMMARY

Described hereinabove are various embodiments of a unique filter whose passband is in the megahertz range and whose bandwidth is less than 1 hertz. In one of the embodiments, means are disclosed for monitoring the output frequency of one of the internal, low-frequency filters, and for developing an automatic frequency control signal to adjust the frequency of the local oscillator. Simultaneously the passbands of the low-frequency filters are narrowed as the local oscillator is brought into proper adjustment. In this connection it should be noted that the use of the filter output signal to control the filter bandwidth is not limited to filters of the particular type described herein. More generally, this aspect of the present invention can be applied to all classes of filters wherein variable band-width, controlled by the filter output signal, is desired.

In a third embodiment of the invention, the high-frequency output signal from the filter is translated in frequency and used as the local oscillator. This eliminates the need for a permanent high-frequency signal source at each filter after the filter has been made operative by means of a priming oscillator, which is temporarily employed for this purpose.

It will be recognized that the various circuits described in connection with FIGS. 8 through 12 are merely illustrative of the types of circuit that can be employed in connection with the various illustrative embodiments of the invention. Similarly, no attempt has been made, in all instances, to adjust direct current signal levels. Thus, amplifiers and direct current sources (not shown) would be included, as required. It is, accordingly, understood that the above-described arrangements are merely illustrative of but a small number of the many possible arrangements that can readily be devised by those skilled in the art without departing from the spirit and scope of the invention.

I claim:

1. An electromagnetic wave bandpass filter, having a center frequency $f$, comprising:

first and second signal processing wavepaths, each including, in cascade, a down-converter, a low-frequency, bandpass filter having a center frequency $f_n$, and an up-converter;

a local oscillator, nominally tuned to a frequency F that differs from $f$ by an amount $\Delta f$ equal to $f_n$, coupled to each of said converters in such phase that the output signal from each converter in said first wavepath is in time quadrature with the output signal from the corresponding converter in said second wavepath;

input means for equally coupling the input ends of said down-converters to a common input circuit;

and output coupling means for selectively coupling wave energy at frequency $f$ between said up-converters and a common output circuit.

2. The filter according to claim 1 wherein said output coupling means is a hybrid coupler.

3. The filter according to claim 1 wherein the ratio of $f$ to $f_n$ is $10^6$ or greater.

4. The filter the to claim 1 wherein $f$ is in the megahertz range and $f_n$ is of the order of one hertz.

5. The filter according to claim 1 including:

means for monitoring the frequency of the output signal from one of said low-frequency filters and for generating an automatic frequency control signal whenever said frequency deviates from $f_n$;

and means for coupling said control signal to said local oscillator for controlling the frequency of said oscillator.

6. The filter according to claim 5 wherein the bandwidth of said low-frequency filters is variable; and wherein said monitoring means generates a second signal for varying the bandwidth of said low-frequency filters.

7. The filter according to claim 1 including:

a frequency converter, for shifting the frequency of the output signal obtained from said filter from $f$ to F;

means for coupling a component of said filter output signal to said converter;

and means for utilizing said frequency-shifted signal as the local oscillator for said filter.

* * * * *